United States Patent [19]

Gorrieri et al.

[11] Patent Number: 5,022,511
[45] Date of Patent: Jun. 11, 1991

[54] SYSTEM FOR EQUALLY SPACING AND TRANSFERRING ITEMS FROM A FIRST TO A SECOND CONVEYOR

[75] Inventors: Giordano Gorrieri, Pianoro; Ivo Balestra; Luciano Nannini, both of Casalecchio di Reno; Alberto Mondani, Bologna, all of Italy

[73] Assignee: Azionaria Costruzioni Macchine Automatiche A.C.M.A. S.p.A., Italy

[21] Appl. No.: 444,008

[22] Filed: Nov. 30, 1989

[30] Foreign Application Priority Data

Nov. 30, 1988 [IT] Italy ................................ 3679 A/88

[51] Int. Cl.[5] ............................................. B65G 47/26
[52] U.S. Cl. ................................ 198/460; 198/471.1; 198/803.5
[58] Field of Search ............... 198/460, 461, 464.3, 198/471.1, 803.5

[56] References Cited

U.S. PATENT DOCUMENTS

| | | | |
|---|---|---|---|
| 3,275,165 | 9/1966 | Vedvik | 198/803.5 X |
| 3,300,063 | 1/1967 | Jensen et al. | 198/803.5 X |
| 3,302,803 | 2/1967 | Mooney | 198/471.1 X |
| 3,335,841 | 8/1967 | Klingel et al. | 198/460 |
| 3,858,709 | 1/1975 | Banyas et al. | 198/803.5 X |
| 3,941,233 | 3/1976 | Aivola et al. | 198/471.1 |
| 4,059,187 | 11/1977 | Rueff et al. | 198/471.1 X |
| 4,135,619 | 1/1979 | Cerboni | 198/471.1 |
| 4,883,163 | 11/1989 | Gamberini et al. | 198/460 |

FOREIGN PATENT DOCUMENTS

| | | |
|---|---|---|
| 2244174 | 3/1973 | Fed. Rep. of Germany ... 198/471.1 |
| 2362727 | 6/1974 | Fed. Rep. of Germany ... 198/471.1 |

Primary Examiner—Robert P. Olszewski
Assistant Examiner—James R. Bidwell
Attorney, Agent, or Firm—Gifford, Groh, Sprinkle, Patmore and Anderson

[57] ABSTRACT

A system for picking up randomly-spaced items in particular cakes of soap, off a first conveyor belt and transferring the same in equally-spaced manner on to a second conveyor belt; which system comprises a rotary conveyor traveling between the first and second conveyors, fitted with a series of equally-spaced pick-up heads, and traveling at a predetermined greater speed than the first conveyor; and an electronic control system having processing device for detecting a position wherein a pick-up head corresponds with an item, and for consequently enabling, by lowering and applying the suction of, the pick-up head for picking the item off the first conveyor; which processing device also provide for disabling, by cutting off the suction of and raising, the pick-up head, for releasing the item and transferring it in controlled, equally-spaced manner on to the second conveyor.

40 Claims, 8 Drawing Sheets

5,022,511

SYSTEM FOR EQUALLY SPACING AND TRANSFERRING ITEMS FROM A FIRST TO A SECOND CONVEYOR

BACKGROUND OF THE INVENTION

The present invention relates to a system for equally spacing and transferring items from a first to a second conveyor. In particular, the present invention relates to a system for successively picking up randomly-spaced items off a first conveyor belt and feeding the same, equally-spaced, on to a second conveyor belt, possibly featuring equally-spaced containers. The present invention is particularly suitable for use on packing facilities, for equally spacing fragile items, such as cakes of soap or similar, fed on to one or more wrapping machines.

In the following description, reference will be made, purely by way of example, to the packing of cakes of soap, though this is in no way to be construed as limiting the scope of the present invention.

On known manufacturing facilities, the soaps coming off the manufacturing machine are fed in randomly-spaced manner on to a conveyor belt by which they are fed on to a rotary conveyor designed to pick them up successively and feed them in equally-spaced manner on to a second conveyor belt supplying the wrapping machines. The rotary conveyor comprises a number of equally-spaced pick-up heads, each featuring a sucker for gripping and retaining a respective cake of soap, for successively gripping the soaps at a pick-up station wherein they are arrested by a fixed stop member. This is required for ensuring the soaps, which are randomly spaced on the first conveyor belt, are safely positioned within the operating range of the pick-up heads prior to pick-up.

A major drawback of transfer systems of the aforementioned type is that the soaps, which are of soft and therefore highly fragile consistency when they come off the manufacturing machine, are frequently damaged by impact against the fixed stop member.

To overcome the aforementioned drawback, a system has been proposed by the present Applicant, in which the stop member is dispensed with, and the soaps travel along a conveyor belt located beneath a rotary conveyor featuring a number of equally-spaced pick-up suckers traveling in the same direction as but faster than the soaps on the underlying conveyor belt. On said system, considerable suction is exerted constantly by the pick-up suckers, which skim over the soaps as they travel along. Owing to the different speeds of the conveyor belt and pick-up members, each soap is contacted in unprearranged manner by the pick-up member, which sucks it off the conveyor belt and feeds it on to a further conveyor.

A major drawback of the above system is that the considerable suction required for lifting the soaps off the conveyor belt may easily result in damage to the same. Furthermore, no provision is made for ensuring the soaps are picked up centrally, pick-up being limited to simply gripping the soaps haphazardly when a fairly extensive portion is presented beneath the pick-up members, thus resulting in a disorderly arrangement of the same on said further conveyor. Finally, failure of the above system to provide for accurate centering of the soaps means that pick-up is seriously affected by variations in the size and shape of the same.

SUMMARY OF THE INVENTION

The aim of the present invention is to provide a system of transferring randomly-spaced items from a first conveyor on to a second conveyor on which said items are equally spaced, and which is designed to overcome the drawbacks typically associated with known systems of the aforementioned type.

With this aim in view, according to the present invention, there is provided a system for picking up randomly-spaced items off first conveyor means and transferring the same in equally-spaced manner on to second conveyor means, said system comprising third conveyor means traveling between said first and said second conveyor means, and a series of pick-up means assigned to said third conveyor means, and wherein the speed of said third conveyor means differs from that of said first conveyor means; characterised by the fact that it comprises an electronic control system comprising processing means for determining a position wherein at least one of said pick-up means corresponds with one of said items, and for accordingly enabling said pick-up means for lifting said item off said first conveyor means; said processing means also providing for subsequently disabling said pick-up means for transferring said item in controlled, equally-spaced manner on to said second conveyor means.

BRIEF DESCRIPTION OF THE DRAWINGS

A preferred embodiment of the present invention will be described by way of example with reference to the accompanying drawings, in which.

DETAILED DESCRIPTION OF THE INVENTION

Figure 1:
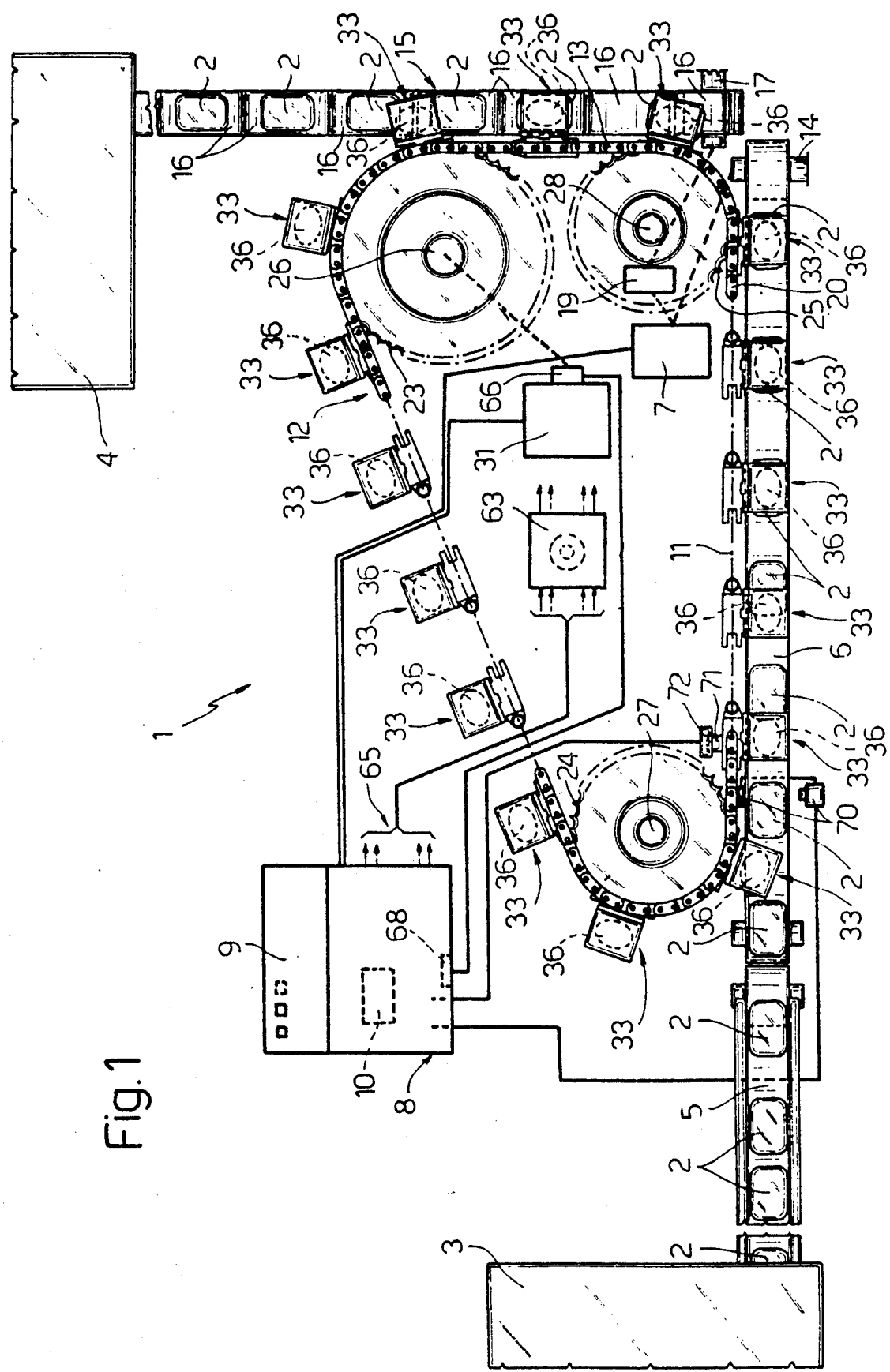
FIG. 1 shows a schematic plan view of a transfer system in accordance with the teachings of the present invention.
Figure 2:
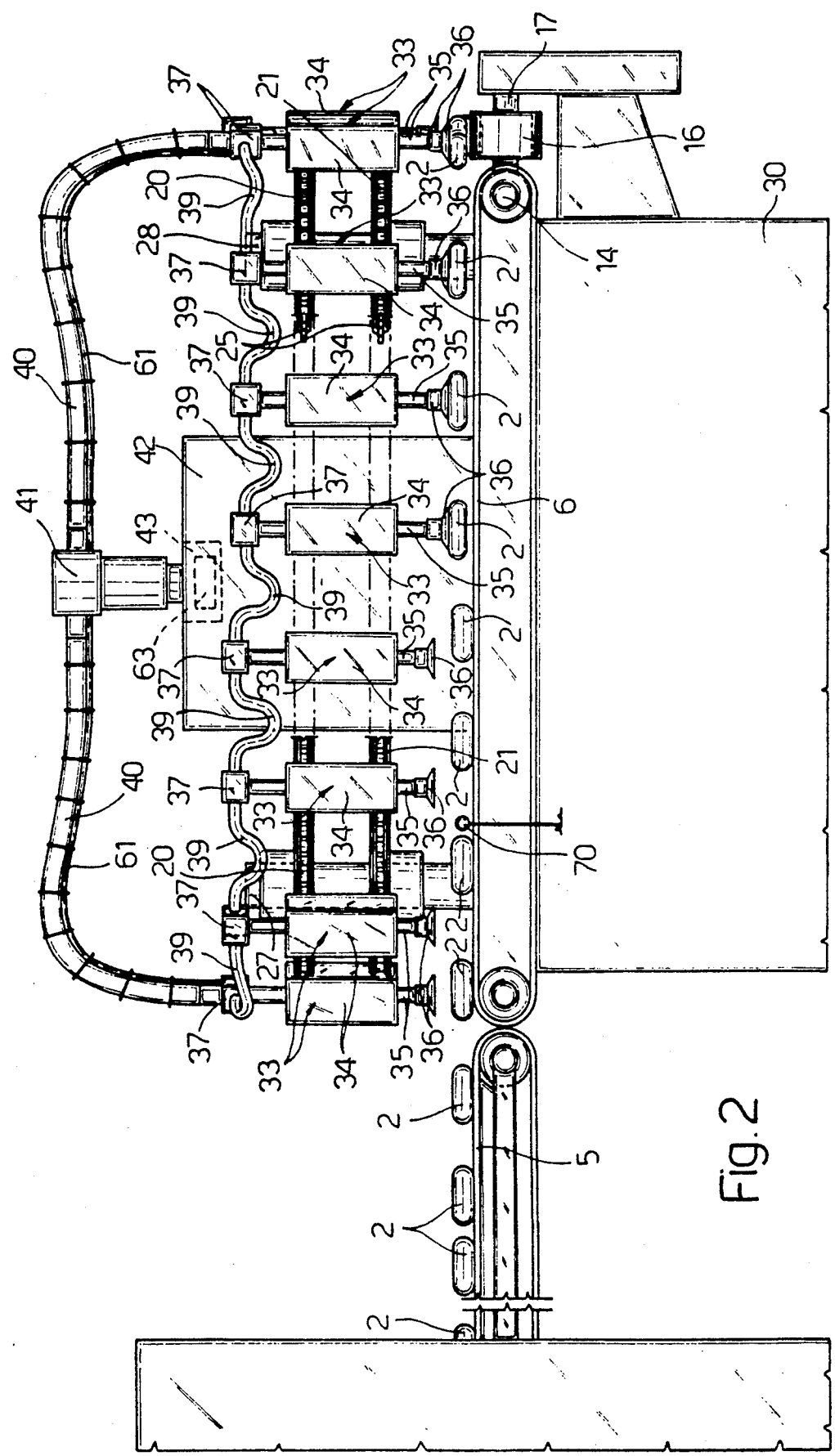
FIG. 2 shows a schematic view of the FIG. 1 system.

Number 1 in FIGS. 1 and 2 indicates the system according to the present invention, for successively transferring items 2 from an output machine (e.g. a known manufacturing machine) shown schematically by block 3, to a user machine (e.g. a known wrapping machine) shown schematically by block 4. Said items 2, which in the example shown consist of cakes of soap, are fed in randomly-spaced manner by output machine 3 on to a horizontal conveyor belt 5, by which they are fed on to a further in-line horizontal conveyor belt 6 driven at a faster speed than conveyor 5 by electric drive means 7 via an end drive roller 14. The speed of said electric drive means 7 is controlled by an electronic control system 8 comprising a processing unit 10, conveniently a PLC, and having a control and indicator panel 9.

Said conveyor 6 travels beneath a straight, horizontal branch 11 of a rotary conveyor 12 traveling along a route substantially in the form of a right-angle triangle.

Said branch 11 extends substantially along one side of said right-angle triangle, whereas a second horizontal branch 13, running along the other side of said right-angle triangle, is located over the input portion of a substantially horizontal conveyor 15 arranged perpendicular to conveyor 6 and having equally-spaced pockets 16, each designed to house an item 2 transferred as described later on between said conveyors 6 and 15. Said conveyor 15 is arranged facing the input of user machine 4, and is driven, via an end drive roller 17, by said electric drive means 7 with a block 19 in between for regulating the transmission ratio and so imparting a predetermined speed in relation to that of rotary conveyor 12, as described in more detail later on.

Said conveyor 12 comprises two superimposed horizontal chains 20, 21 looped partially about three respective pairs of gears 23, 24, 25 located at the tips of said right-angle triangle. Each pair of gears 23, 24, 25 is fitted on to a respective vertical shaft 26, 27, 28 supported on the top wall of the main center body 30 of system 1. Shaft 26 is turned anticlockwise by electric drive means 31 controlled by electronic control system 8 in such a manner that rotary conveyor 12 travels faster than conveyor 6 and at predetermined ratio of 4/3.

Chains 20 and 21 are fitted with a number of equally-spaced pick-up heads 33 (16 in the FIG. 1 example), each comprising a substantially parallele-piped box body 34 connected externally and vertically to chains 20 and 21, and from the bottom wall of which extends a rod 35 fitted on the bottom end with a sucker 36. The top end of rod 36 also extends from the top wall of body 34, and is connected to a block 37 which provides for series-connecting and enabling pneumatic communication between pipes 39 between adjacent pairs of pick-up heads 33. Two substantially equally-spaced blocks 37 are also connected internally to two compressed air pipes 40, which are connected at the other end to a turret 41 supported in rotary manner on a block 42 on main body 30 of system 1. Inside said rotary turret 41, the outlets to said pipes 40 communicate pneumatically with an inlet connected to fixed body 43 in block 42 via known means for retaining fixed and rotary components.

Figure 3:
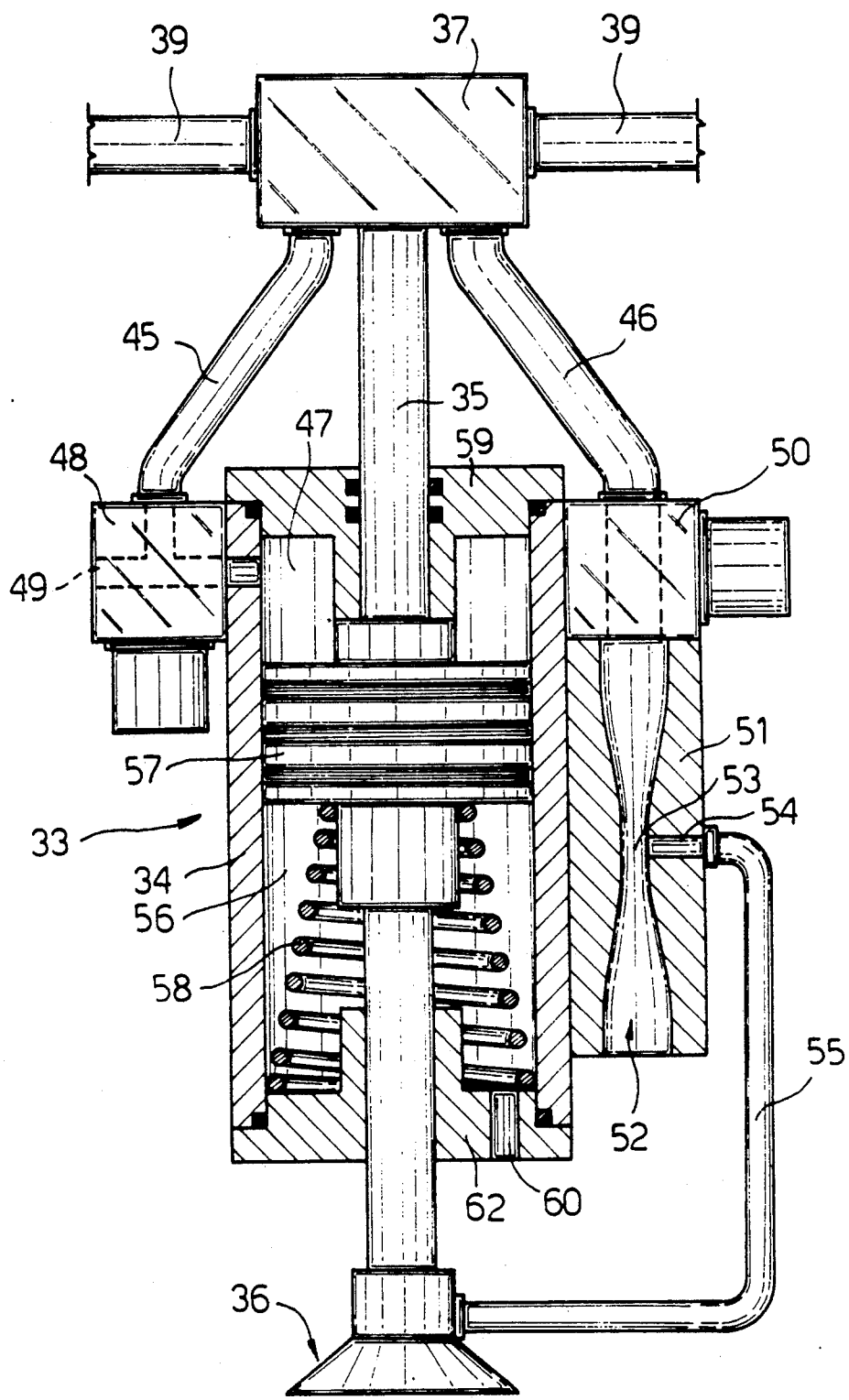
FIGS. 3 and 4 show larger-scale lateral sections of a pick-up component on the FIG. 1 system in two different operating positions.

As shown more clearly in FIG. 3, which shows a more detailed view of pick-up head 33, from each block 37 there extend two pipes 45, 46. Pipe 45 provides for pneumatic connection to an upper chamber 47 in body 34 via a series-connected electrovalve 48 communicating externally via way 49, whereas pipe 46 provides for pneumatically connecting, via a series-connected electrovalve 50, a block 51 secured to body 34 and housing a through duct 52 having a narrow central portion 53 in the form of a Venturi tube. At said portion 53, block 51 presents a perpendicular duct 54 communicating externally and connected to a pipe 55, the other end of which is connected to and communicates pneumatically with the bottom concave portion of sucker head 36. The portion of rod 35 inside body 34 is fitted with a cylinder 57, which provides, in sliding manner, for peripherally sealing the lateral wall of chamber 47, and also acts as an end support for a cylindrical spring 58 housed coaxially with rod 35 inside a bottom chamber 56 of body 34. Said chamber 56 communicates externally via a hole 60 formed in the bottom 62 of body 34 and on which rests the other end of spring 58. Both bottom 62 and top cover 59 of body 34 present a central annular portion projecting inwards of body 34 and acting as a limit stop for cylinder 57 and, consequently also, rod 35 and sucker 36.

Electrovalves 48 and 50 on each pick-up head 33 are connected electrically via respective branches of cables 61 running along pipes 40 to blocks 37 (FIG. 2) and connected, at block 42, to an element 63 of fixed body 43, which provides for electrically connecting fixed and rotary elements, for example, via sliding contacts. As shown schematically in FIG. 1, element 63 provides for selective, electrical connection of the electrovalves on pick-up heads 33 to respective output connections 65 on electronic control system 8.

Again with reference to FIG. 1, the output shaft of electric motor 31 powering rotary conveyor 12 is connected to a sensor 66 (encoder) for detecting rotation of the output shaft. In more detail, said sensor 66 supplies a series of pulses, which are counted by a high-speed counter 68 on control system 8, and presents a resolving capacity of N (in this case, 256) pulses for each revolution of the output shaft of motor 31, each revolution corresponding to a displacement of rotary conveyor 12 exactly equal to the distance between adjacent pick-up heads 33. As the capacity of counter 68 is much greater than said N number of pulses per revolution supplied by sensor 66, to enable the use of a single counter on control system 8, processing unit 10 determines the content of the first M (in this case, eight) least significant bits in the output signal from counter 68, to locate the current position of a given head 33 within the space between two adjacent heads 33 and in relation to a given reference position, and the content of the next P (in this case, four) most significant bits, to identify which of the sixteen heads 33 the data refers to.

Over conveyor 6, provision is made for a pair of photoemitting and photoreceiving elements 70 connected to control system 8 and designed to detect passage of an item 2 in a given position.

One of pick-up heads 33 is fitted with a side plate 71 which, on passing through a pair of photoemitting and photoreceiving elements 72, supplies control system 8, via said elements 72, with a start position reference signal for subsequently relating the signals from sensor 66 and counter 68 to specific pick-up heads 33.

Figure 9A:
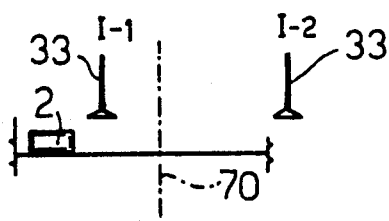
FIG. 9 shows a number of schematic operating positions of pick-up members and the items for transfer on the FIG. 1 system.
Figure 9B:
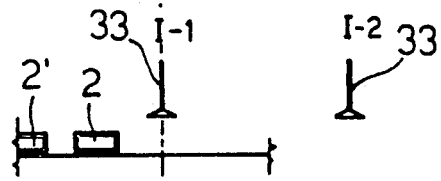

In actual use, soaps 2 are fed in randomly-spaced manner off output machine 3 on to conveyor belt 5, by which they are fed rightwards (FIGS. 1 and 2) on to conveyor belt 6 which, traveling faster than conveyor belt 5, separates soaps 2 even further. Following entry of the basic operating parameters on panel 9 (resolving capacity of sensor 66, release position of items 2 by heads 33, length of items 2, pneumatic operating delay of heads 33, etc;) and a transient start phase wherein pick-up heads 33 are identified by the passage of plate 71 through photoelements 72, control system 8 determines which crosses photoelements 70 first, an item 2 or a pick-up head 33 (this is detected by central processing unit 10 checking the output of high-speed counter 68 as described in more detail later on). The latter case is shown in FIG. 9b (in which the dotted line indicates the plane of photoelements 70) and may occur as a result of no items 2 crossing photoelements 70 in the foregoing space between two heads 33, or as a result of item 2 preceding the next head 33 (in excess of a predetermined limit), or following the foregoing head 33. Central processing unit 10 therefore instructs that the delayed item 2 be picked up by the head 33(I) following the one (I−1) currently crossing photoelements 70. Said head 33(I) is identified, as already stated, by processing unit 10 determining the next P number of most significant bits in the output signal from counter 68, the first M number of least significant bits providing for quantifying displacement towards photoelements 70 within the space between two adjacent heads 33.

Pick-up of item 2 by head 33(I) is made possible by virtue of rotary conveyor 12 traveling faster than conveyor 6. Given a speed ratio of 43, this means item 2 is picked up within a maximum of four spaces between heads 33.

Figure 4:
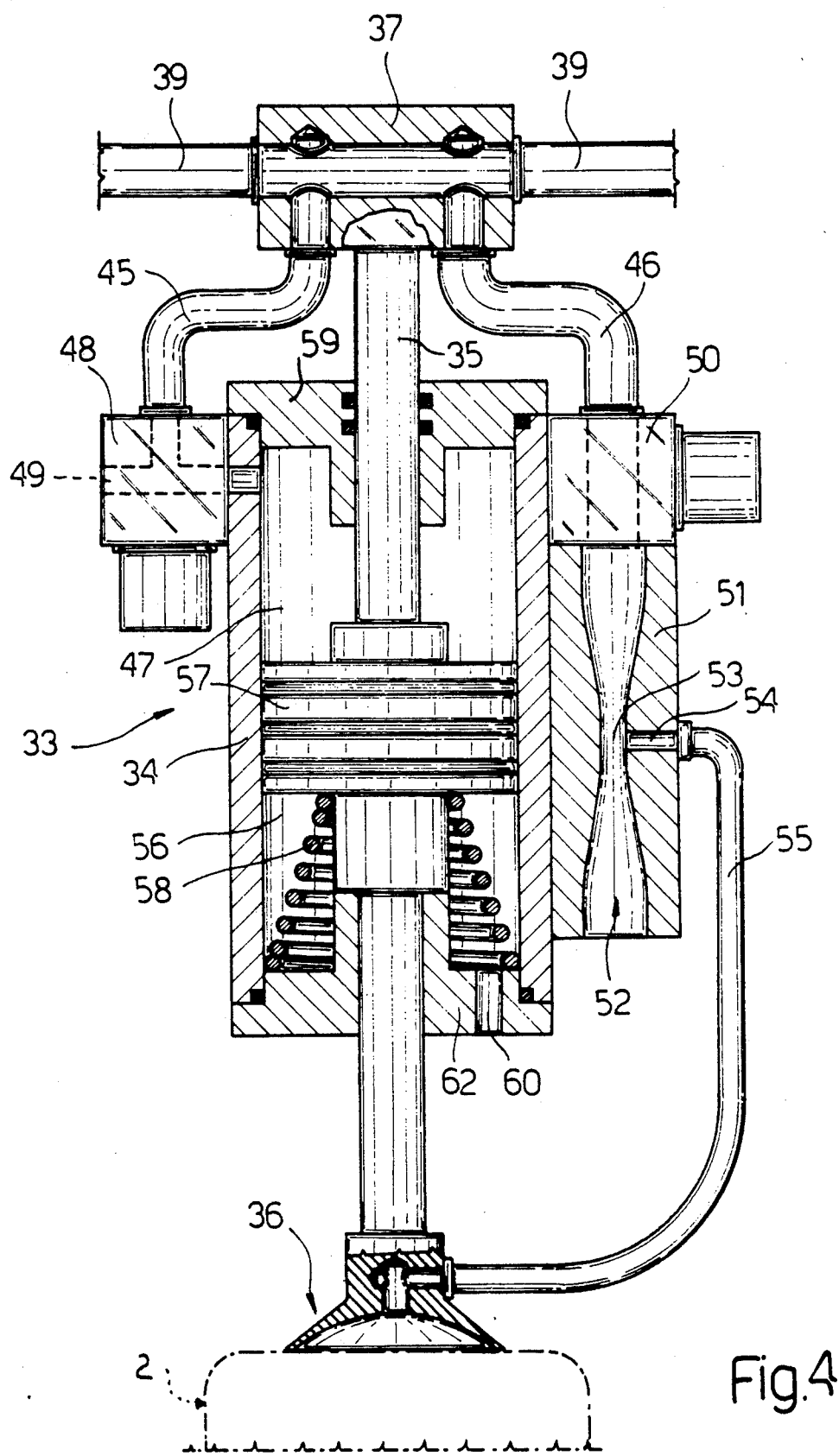
Figure 9C:
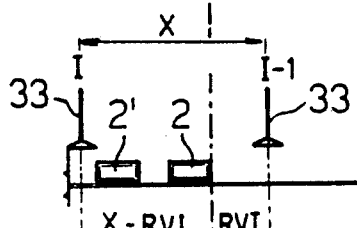
Figure 9D:
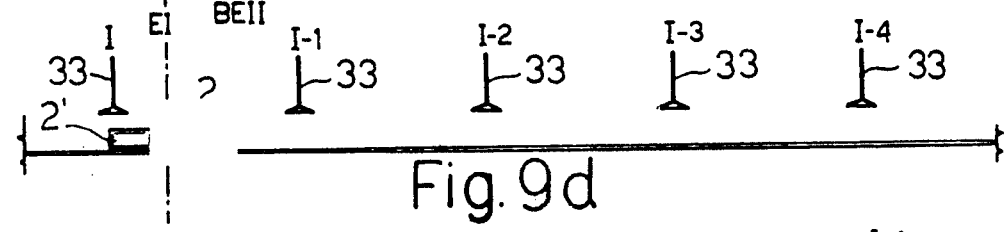
Figure 9E:
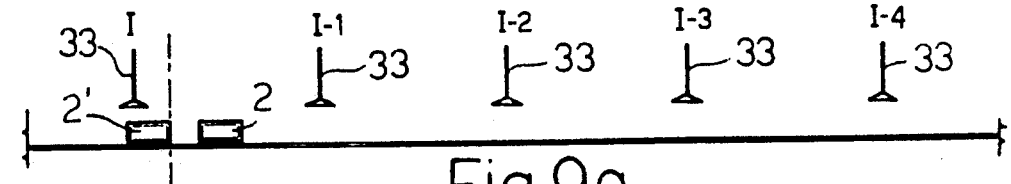
Figure 9F:
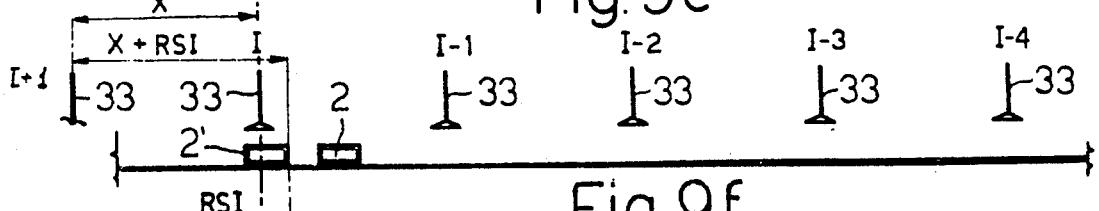
Figure 9G:
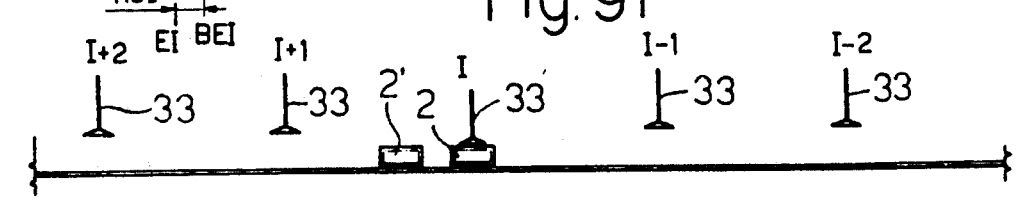

On the basis of the above conditions, central processing unit 10 detects the passage of soap 2 through photoelements 70 (FIG. 9c), quantifies the delay via parameter RVI (as described in detail later on), and computes the distance (determined by the number of pulses supplied by sensor 66 and picked up by counter 68) within which head 33(I) will be located over soap 2 (FIG. 9g). When this occurs, central processing unit 10, via respective connection 65, opens electrovalves 48 and 50 on head 33(I), and compressed air is fed into the top portion of chamber 47 (FIGS. 2 and 4) thus causing cylinder 57 to move down on to the stop on bottom 62 (FIG. 3), and rod 35 with sucker 36 to move down just over soap 2. At the same time, the compressed air fed into duct 52 produces sufficient suction in the cavity of sucker 36 to lift soap 2 up into contact with sucker 36, by which it is detached from conveyor 6.

With electrovalves 48 and 50 still open, soap 2 is fed forward at the faster speed of rotary conveyor 12 (FIG. 9h) until head 33(I) reaches a predetermined position over the center of pocket 16 on conveyor 15; said position being determined accurately by calculating the distance covered by conveyor 12 (and determined by the number of pulses supplied by sensor 66 and picked up by counter 68) from the cycle start position of head 33(I) corresponding to passage of the previous head 33(I−1) through photoelements 70. At this point, central processing unit 10, via respective connection 65, cuts off air supply to electrovalves 48 and 50 on head 33(I), which, by also cutting off the air supply in duct 52 (FIG. 3), eliminates suction in the cavity of sucker 36, thus causing soap 2 to drop down on to conveyor 15. At the same time the air in chamber 47 is blown out via way 49 enabled by electrovalve 48, and cylinder 57 is forced upwards by spring 58, thus raising rod 35 together with sucker 36.

Figure 9H:
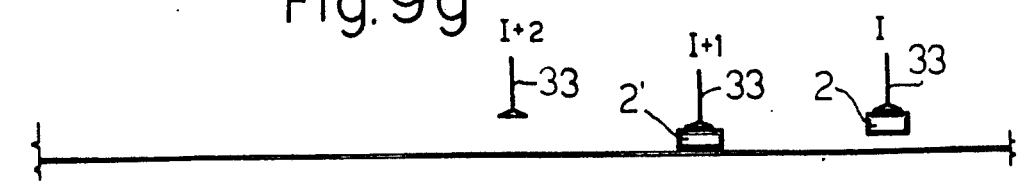

In the event of soap 2 preceding the next pick-up head 33 through photoelements 70 (as shown in FIG. 9e, in which soap 2′ precedes head 33(I)), central processing unit 10 instructs that soap 2′ be picked up by the head 33(I+1) following the next one (I) to go through photoelements 70. In the same way as already described, central processing unit 10 therefore detects passage of head 33(I) through photoelements 70 (FIG. 9f), quantifies the delay via parameter RSI (described in detail later on), and calculates the distance (determined by the number of pulses supplied by sensor 66 and picked up by counter 68) within which head 33(I+1) will be positioned over soap 2′ (FIG. 9h). When this occurs, central processing unit 10, via respective connection 65, opens electrovalves 48 and 50 on head 33(I+1) so that, as already described, soap 2′ is lifted up into contact with sucker 36, by which it is detached from conveyor 6.

With electrovalves 48 and 50 still open, soap 2′ is fed forward until head 33(I+1) reaches said predetermined position over the center of pocket 16 on conveyor 15; said position, in this case also, being determined accurately by calculating the distance covered by conveyor 12 from the cycle start position of head 33(I+1) corresponding to passage of head 33(I) through photoelements 70. At this point, central processing unit 10, via respective connection 65, cuts off air supply to electrovalves 4B and 50 of head 33(I+1), thus causing soap 2′ to drop down on to conveyor 15, and rod 35 to move up together with sucker 36.

The above operations may be performed simultaneously for the various pick-up heads 33, by virtue of the latter being controlled separately by control system 8. Furthermore, by virtue of control system 8 establishing the speeds of conveyors 12 and 15 and the fixed ratio between the two via block 19, each head 33 moves successively into said predetermined position over a respective pocket 16 on conveyor 15, wherein electrovalves 48 and 50 are disabled, thus enabling items 2 to be fed by conveyor 15 to machine 4 in equally-spaced manner (providing, obviously, that the maximum spacing of items 2 fed on to conveyor 6 is within a predetermined limit).

Operation of transfer system 1 according to the present invention will now be described with reference to the operating block diagram in FIG. 5 relative to processing unit 10 of control system 8.

The program of processing unit 10 commences with block 101, which provides for acknowledging the initial operating parameters already mentioned: incremental count (X) of counter relative to displacement of conveyor 12 by the distance between two pick-up heads 33; incremental count (KHXXX) of counter 68 relative to displacement of head 33 preceding the one currently moving through photoelements 70 into the disabling position wherein item 2 is released on to conveyor 15; incremental count (RSMAX) of counter 68 relative to maximum advanced passage of item 2 through photoelements 70 in relation to passage of the next pick-up head 33(I), in excess of which value item 2 is interpreted by processing unit 10 as being delayed in relation to the preceding head 33(I−1) through photoelements 70; incremental count (KA) of counter relative to the delay between enabling of the electrovalves on head 33 by control system 8 and actual suction by sucker 36 on item 2, said delay being due to the time taken to actually enable the electrical and pneumatic components involved, and being determined as a function of the length of item 2, so as to ensure sucker 36 is lowered substantially over the central portion of item 2; a count constant (KA1) for calculating the point at which pick-up heads 33 are enabled, and which is a function of constants entered beforehand according to the equation (X*4)−KA as explained in more detail later on.

Block 101 goes on to block 102, which enables a subroutine performed periodically, as described in detail later on, for detecting the relative positions of soaps 2 and pick-up heads 33 through photoelements 70 and, as already stated, assigning each soap 2 the consecutive reference number of the head 33 by which it is to be picked off conveyor 6. Block 102 goes on to block 103, which also enables a subroutine performed periodically, as described in detail later on, for enabling the selected head 33 as already described, ensuring soap 2 is picked up centrally, and disabling head 33 in such a position as to ensure soap 2 is transferred in equally-spaced manner on to conveyor 15. Block 103 then goes back to block 102 for progressively and sequentially repeating the partial stages of said subroutines, and so controlling a number of heads 33 simultaneously.

Figure 6:
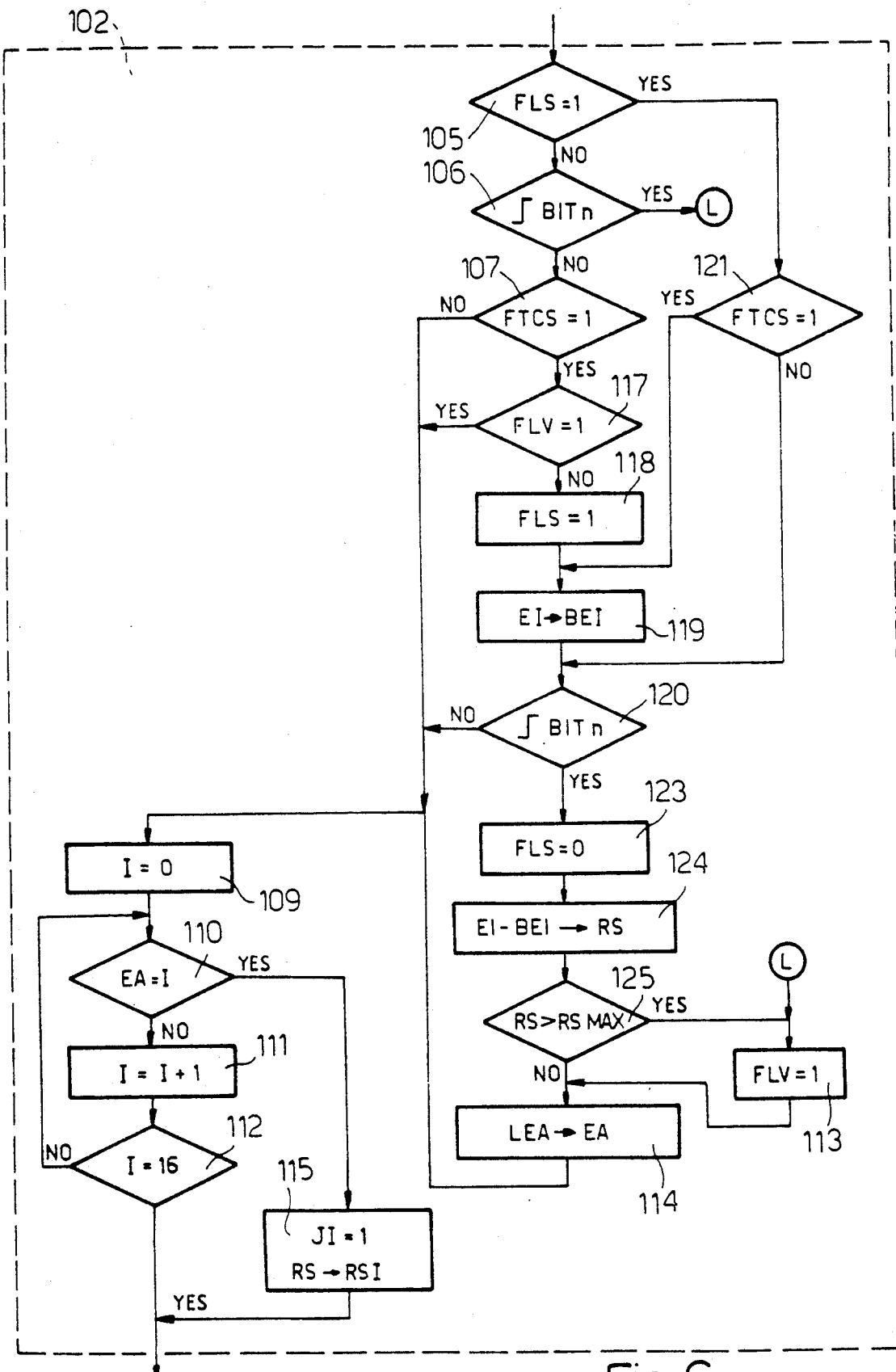

FIG. 6 shows a more detailed view of block 102 commencing with a block 105, which determines a logic 1 setting of an FLS indicator showing that the selected processing condition is that in which item 2 precedes the closest pick-up head 33 through photoelements 70 (as shown by item 2' and head 33(I) in FIG. 9e). In the event of a negative response (as in the FIG. 9a case, in which no processing condition is detected), block 105 goes on to block 106, which determines a rising edge of a specific bit n (in this case, the seventh) on counter 68, indicating that pick-up head 33(I−1) is crossing photoelements 70. In the event of a negative response (FIG. 9a), block 106 goes on to block 107, which determines whether the FTCS signal from photoelements 70 is at logic level 1, indicating that item 2 is crossing photoelements 70. In the event of a negative response (FIG. 9a), block 107 goes directly to the final stage in the subroutine, which enables processing of the point at which item 2 is to be picked up by selected head 33. As, in the FIG. 9a case, the EA value relative to reading of the P (in this case, four) most significant bits on counter 68, following the M bits indicating one step by conveyor 12, has not yet been identified, said final stage of the subroutine is performed repeatedly via block 109, in which I=0; block 110 which determines whether EA=I and, in the event of a negative response, goes on to block 111 in which I=I+1; and block 112 which determines whether I=16 and, in the event of a negative response, goes back to block 110. In the event of a positive response in block 112 (i.e. I=16) indicating that none of the sixteen pick-up heads 33 (numbered I=0 to I=15) has been selected, the subroutine is abandoned. When pick-up head 33(I−1) eventually crosses photoelements 70 (FIG. 9b), the n bit rising edge indicator switches to logic level 1, and, as the subroutine is repeated, block 106 goes on to block 113 wherein the FLV indicator is set to logic level 1 to indicate that the selected processing condition is that in which item 2 is delayed through photoelements 70 in relation to the closest pick-up head 33. Block 113 therefore goes on to block 114, which provides for reading the P most significant bits on counter 68, following the M bits indicating one step by conveyor 12, so as to identify which of the sixteen heads 33 the distance count to the crossover point refers to. In the FIG. 9b case, the head identified as being the one to which the count refers is head 33(I), and the value from 0 to 15 indicated by said P bits read by processing unit 10 in the absolute value (LEA) of counter 68 is entered into indicator EA by block 114, which then goes on to the final stage of the subroutine already described. When the increasing value of I equals the EA indicator value determined by block 114, block 110 goes on to block 115 wherein an indicator JI is set to logic value 1 corresponding to an I value equal to EA in block 110 and relative to enabling of the selected head 33 via block 103. Block 115 also provides for entering the value of parameter RS (detected as described later on) into the specific memory block relative to the selected head 33(I), after which, it abandons the subroutine consisting of block 102.

When item 2 eventually reaches the photoelement 70 crossover point (FIG. 9a), the n bit rising edge indicator is set to logic value 0, and the photoelement signal change indicator FTCS to logic value 1. As the subroutine is repeated, therefore, block 105 goes to block 106, block 107, and finally block 117, which determines the FLV=1 condition established by block 113, and goes on to block 109 in the final stage of the subroutine, which maintains the (JI=1) condition previously established for enabling pick-up head 33(I) with I=EA via blocks 110 and 115.

In the event of item 2 preceding the closest pick-up head 33 through photoelements 70 (as in the case of item 2' and head 33(I) in FIG. 9e), prior to item 2 reaching the crossover point (FIG. 9d), the negative responses in blocks 105, 106 and 107 bring the latter to the final stage in the subroutine, as already described in connection with FIG. 9a, and no head 33 is identified. When item 2' eventually crosses photoelements 70 (FIG. 9e), the n bit rising edge indicator is set to logic value 0, and photoelement signal change indicator FTCS to logic value 1. Block 105 therefore goes to block 106 and block 107, the positive response of which brings it to block 117 which, detecting FLV=0, goes on to block 118, wherein the FLS indicator is set to logic level 1 indicating that the processing condition selected is that in which item 2' precedes the closest pick-up head 33(I) through photoelements 70. Block 118 then goes on to block 119, which enters into a BEI memory register the incremental value (EI) of counter 68 indicated by said M least significant bits indicating location of item 2' at the photoelement crossover point within the space between two heads 33. Block 119 then goes on to block 120 which, detecting a negative n bit indicator condition, goes on to the final stage in the subroutine, and no head 33 is identified for selection.

When pick-up head 33(I) eventually reaches the photoelement crossover point (FIG. 9f), the n bit rising edge indicator is set to logic value 1, and the FTCS indicator to logic value 0. As the subroutine is repeated, therefore, block 105, which now detects the positive condition established by block 118, goes on to block 121, which determines whether the FTCS indicator =1. In view of the current negative condition, block 121 goes on to block 120 which, detecting the current positive condition, goes on to block 123 which sets the FLS indicator to 0 to terminate the processing condition wherein item 2' precedes the closest pick-up head 33(I) through photoelements 70. Block 123 then goes on to block 124, which calculates the lag of head 33(I) in relation to crossover by item 2' (FIG. 9f) by calculating the difference in the incremental count of counter 68 within the count space between heads 33. As the current count value (FIG. 9f with head 33(I) at the photoelement crossover point) equals EI. corresponding to a count of one space between heads 33, and as the previous count value (FIG. 9e with item 2' at the crossover point) has been stored in the BEI memory register by block 119, said count difference is calculated by block 124 subtracting the BEI value from the EI value, which is then entered into the RS indicator. Block 124 then goes on to block 125, which determines whether said RS value is greater than a predetermined RSMAX value. In the event of a negative response, block 125 goes on to block 114 which, as already described, identifies head 33 by reading the P most significant bits of counter 68 and, on commencing the count for head 33(I+1) in the FIG. 9f case, enters the indicator of this head into EA and then goes on to the final stage in the subroutine, wherein indicator J(I+1) for enabling pick-up of item 2' by head 33(I+1) is set to logic value 1, and the RS value calculated in block 124 is stored in a specific register RS(I+1) relative to head 33(I+1). In the event of a positive response in block 125, the above cycle for calculating pick-up with FLS=1 is not enabled, and block 125 goes on to block 113, which sets the FLV indicator to logic value 1 and then goes back to block 114, in which case item 2' is not picked up.

In view of the positive condition of block 105 (FLS=1) indicating crossover of an item 2, a positive response in block 121 means that, prior to crossover of photoelements 70 by a head 33 (in which case, block 123 would have zeroed the FLS indicator), a second item 2 has crossed over. This is possible, for example, in the case of closely packed or relatively short items 2. In this case, block 121 goes on to block 119, which again stores in the BEI memory register the EI count value relative to crossover of said second item 2, for updating calculation of the RS value in block 124. As a result, the first item 2 will be ignored, and only the second item 2 will be picked up.

Figure 7:
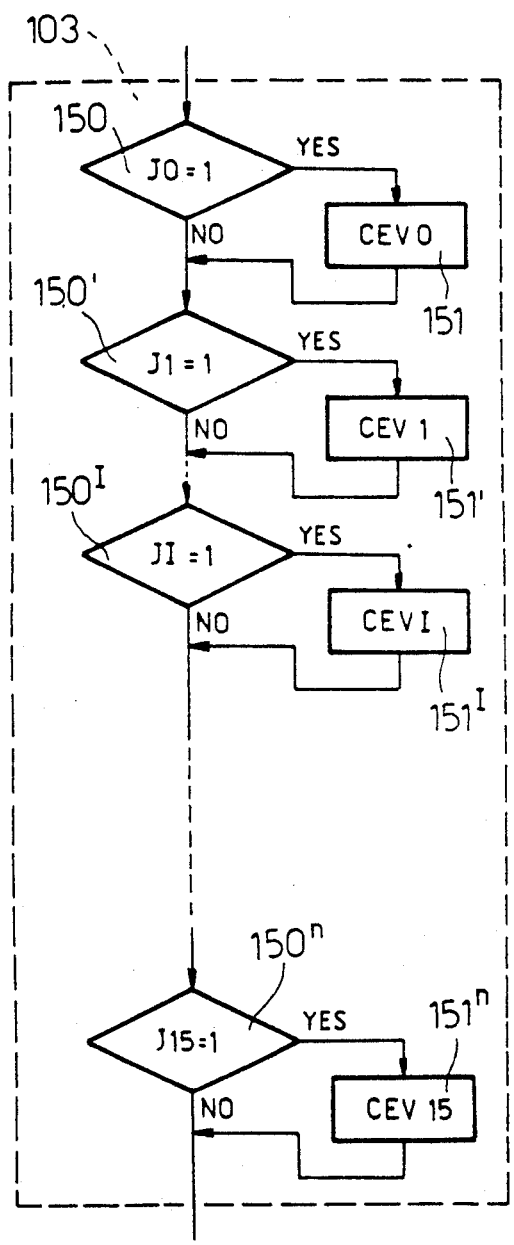
FIGS. 6, 7 and 8 show more detailed operating block diagrams of a number of blocks in the FIG. 5 diagram.

FIG. 7 shows a detailed view of the subroutine performed by block 103. This comprises a first block 150, which determines whether JO=1. A positive response means the indicator has been set to logic value 1 by block 115 in FIG. 6, and that the first of the sixteen heads 33 has been selected to pick up item 2 (as determined by the count on counter 68 commencing from the start reference established by element 71 on the first head 33). Block 150 therefore goes to block 151 (CEV0) which controls enabling and disabling of electrovalves 48 and 50 on said first head 33 for picking up item 2 off conveyor 6 and releasing the same on to conveyor 15. In the event of a negative response in block 150, this and also block 151 go on to block 150' which determines whether J1=1. A positive response means the indicator has been set to logic value 1 by block 115 in FIG. 6, and that the second of the sixteen heads 33 has been selected to pick up item 2. Block 150' therefore goes on to block 151' (CEV1) which controls enabling and disabling of the electrovalves on said second head 33. In the event of a negative response in block 150', this and also block 151' go on to a sequence of similar pairs of blocks of which the 150I-th determines whether JI=1. A positive response means the indicator has been set to logic level 1 by block 115 in FIG. 6, and that, of the sixteen heads 33, head 33(I) has been selected to pick up item 2. Block 150I therefore goes on to the 151I-th block (CEVI) which controls enabling and disabling of the electrovalves on head 33(I). In the event of a negative response in said 150I-th blocks, these and also the 151I-th blocks go on to a series of similar pairs of blocks, the 150n-th and last of which determines whether J15=1. A positive response means the indicator has been set to logic level 1 by block 115 in FIG. 6, and that the last of the sixteen heads 33 has been selected to pick up item 2. Block 150n therefore goes on to block 151n (CEV15) which controls enabling and disabling of the electrovalves on said sixteenth head 33. In the event of a negative response in block 150n, this and also block 151n exit the subroutine of block 103.

Figure 8:
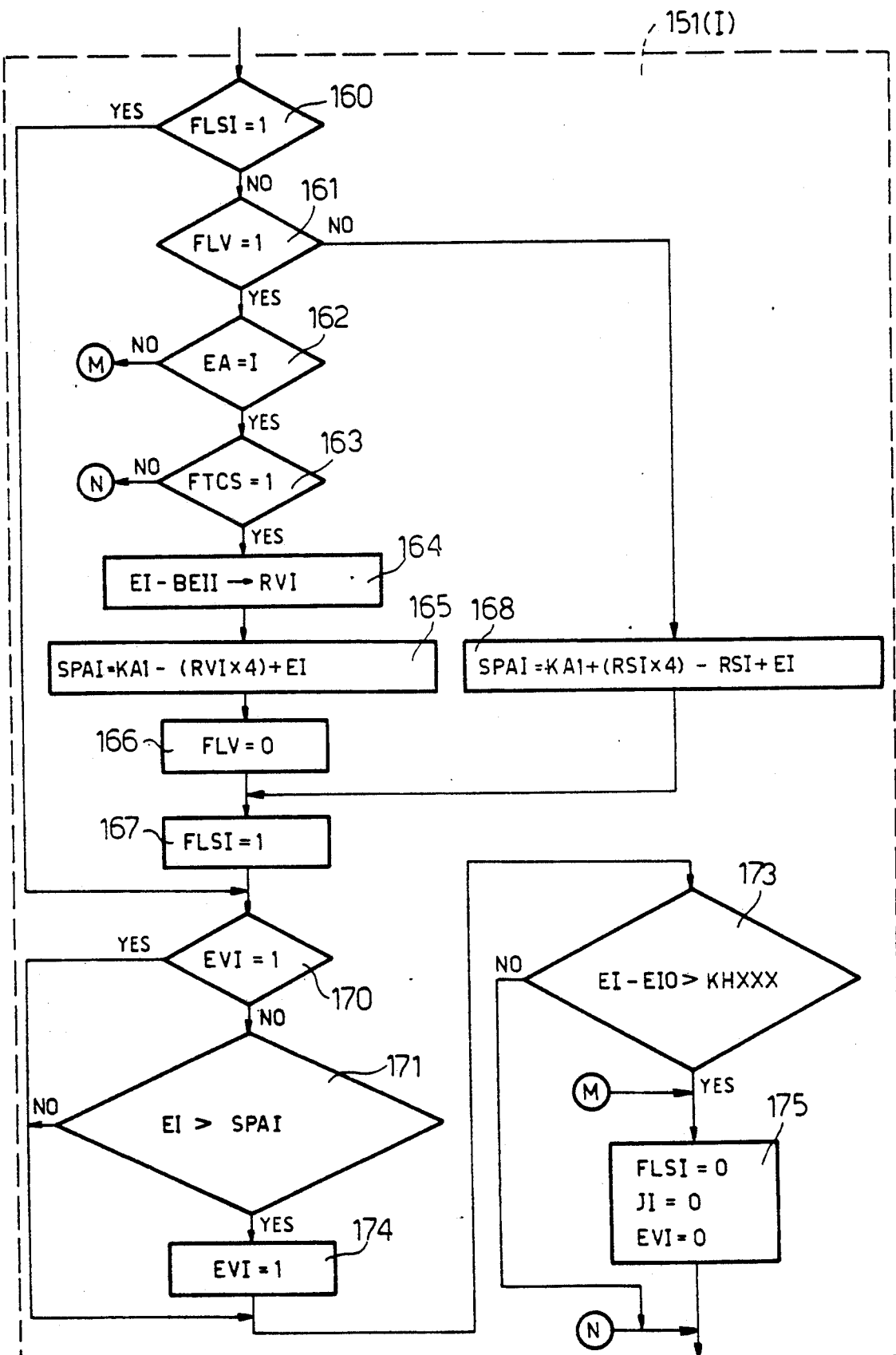

FIG. 8 shows a detailed breakdown of one of similar blocks 151, 151', 151I, . . . 151n. Each block 151, 151', etc. differs as to the value of parameter I, which ranges from 0 to 15 depending on the specific head 33 it is assigned to.

As shown in FIG. 8, a starting block 160 determines whether indicator FLSI is set to logic level 1, indicating that the subroutine has already calculated the point at which item 2 is to be picked up by selected head 33(I). In the event of a negative response, block 160 goes on to block 161, which determines whether indicator FLV has been set to 1 (by block 113 in FIG. 6). In the event of a positive response (FIG. 9b condition), block 161 goes on to block 162, which determines whether I equals the EA value determined by block 114, to ensure the item 2 lag calculation is correctly related to crossover of photoelements 70 by head 33(I−1) preceding the one (I) to be enabled for pick-up, and to which the count on counter 68 in that particular interval refers. In the event of a positive response, block 162 goes on to block 163, which determines whether the FTCS indicator equals 1. As, in the FIG. 9b case, item 2 has not yet reached the crossover point of photoelements 70, FTCS equals 0 and block 163 exits block 151.

When item 2 eventually reaches the crossover point (FIG. 9c), as the subroutine is repeated, blocks 160, 161 and 162 again go to block 163 which, now that FTCS=1, goes on to block 164, which calculates the crossover lag of item 2 in relation to pick-up head 33(I−1) (FIG. 9c) by calculating the difference in the count on counter 68 within the count space between heads 33. As the current count value (FIG. 9c with item 2 at the crossover point) equals the EI value, and as the previous EI value (FIG. 9b with head 33(I−1) at the crossover point) has been stored in BEII by processing unit 10, which knows the count value corresponding to crossover by heads 33 (in this case, a zero start value corresponding to commencement of the space count between two heads 33), said count difference is calculated by block 164 subtracting the BEII value from the EI value, which is entered into the RVI indicator. Block 164 then goes on to block 165, which calculates the pick-up point of item 2 by selected head 33(I) in the form of a count value (SPAI) representing the count increase required for recovering head 33(I) commencing from the FIG. 9c position. Given the 4/3 speed ratio of heads 33 on rotary conveyor 12 in relation to items 2 on conveyor 6, this means heads 33 can recoup a maximum lag of one space (between heads 33) in relation to item 2 within a maximum traveling distance of four spaces. Said recovery distance is obviously proportional to the amount of lag involved. In the FIG. 9c case, assuming X to be the count value of one space between heads 33, and RVI the lag count of item 2, the lag to be recovered by head 33(I) equals a count value of (X−RVI), and must be made up within a proportionate portion of four count spaces, i.e. within a count of (X−RVI)*4. To account for the operating lag of head 33 and the length of item 2, for ensuring this is picked up centrally, the KA value entered by block 101 in FIG. 5 is subtracted from the count, so that the SPAI value comprises said recovery count commencing from the EI count value corresponding to the FIG. 9c position. This therefore gives:

$$SPAI = ((X-RVI)*4) - KA + EI = (X*4) - (RVI*4) - KA + EI,$$

and given $KA1 = (X*4) - KA$ $SPAI = KA1 - (RVI*4) + EI$ (calculated by block 165).

Figure 5:
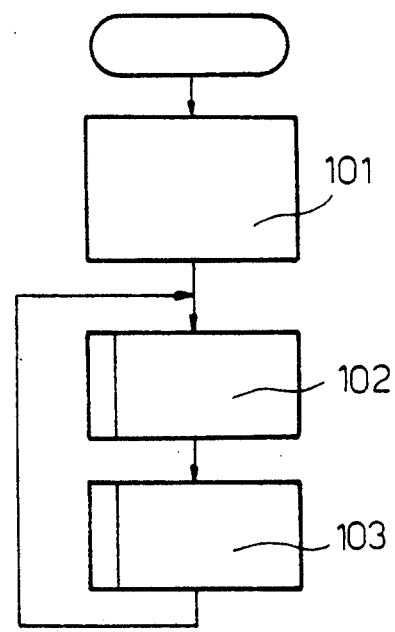
FIG. 5 shows an operating block diagram of a central processing unit on the electronic control system of the FIG. 1 system.

Block 165 then goes on to block 166 wherein FLV=0, i.e. which cancels the selected processing condition wherein crossover of item 2 is delayed in relation to the nearest pick-up head 33, so as to enable pick-up selection for the next item 2 via block 102 in FIG. 5. Block 166 then goes on to block 167 wherein FLSI=1, indicating that the SPAI count for calculating the pick-up point of item 2 has already been calculated for head 33(I).

In the FIG. 9f case, on the other hand, wherein FLV=0 and RSI has been defined by block 124 in FIG. 6, block 161 in FIG. 8 detects a negative condition and goes on to block 168, which obviously makes a different calculation of the SPAI count relative to the pick-up point of head 33. Assuming X to be the count value of one space between heads 33, and RSI the lead count of item 2', the space to be made up by head 33(I+1) equals a count value of (X+RSI), and must be made up within a proportional portion of four count spaces, i.e. within a count of (X+RSI)*4. In this case also, to take into account the operating lag of head 33 and the length of item 2, for ensuring it is picked up centrally, the KA value entered by block 101 in FIG. 5 is subtracted from the count, so that the SPAI value comprises the recovery count commencing from the EI-RSI count value corresponding to the FIG. 9e position.

This therefore gives:

$$SPAI=((X+RSI)*4)-RSI-KA+EI=(X*4)+(-RSI*4)-RSI-KA+EI,$$

and given $KA1=(X*4)-KA$ $$SPAI=KA1+(RSI*4)-RSI+EI \text{ (calculated by block 168).}$$

Block 168 also goes on to block 167 indicating that the SPAI count relative to the pick-up point of item 2' has already been calculated.

Block 167 then goes on to block 170, which determines EVI=1, i.e. whether the signal for enabling electrovalves 48 and 50 on selected head 33(I) has been supplied. In the event of a negative response (as at the start of the subroutine), block 170 goes on to block 171, which determines whether the current count value (EI) on counter 68 is greater than the SPAI pick-up value. In the event of a negative response (pick-up position not yet reached), block 171 goes directly to block 173. As the subroutine is repeated, block 160 eventually detects FLSI=1 as established in block 167, and goes directly to block 170. When the pick-up point is reached (FIG. 9g or 9h), this is detected by block 171 which goes on to block 174, wherein EVI=1, thus enabling electrovalves 48 and 50 on the head 33(I) selected by the program, and so lifting item 2 off conveyor 6.

As the program is repeated, block 160 goes directly to block 170 which, detecting now a positive condition, goes directly to block 173. This determines whether the current count value (EI) on counter 68, commencing from count value EIO corresponding to crossover by the head 33 preceding or following item 2 (FIG. 9b or 9f), is greater than a predetermined count value KHXXXX corresponding to the distance covered by a head 33 on conveyor 12 from the crossover point to the point at which head 33 is disabled and item 2 released on to conveyor 15. In the event of a negative response (release position not yet reached), block 151 is exited. When the release position is eventually reached, however, this is detected by block 173, which goes on to block 175 wherein EVI=0 (for disabling electrovalves 48 and 50 of head 33(I)), FLSI=0 (to cancel the indication that the pick-up point of head 33(I) has been calculated), and JI=0 (to cancel selection of the block 151 subroutine (I) for selection of head 33(I).

In the event of a negative response in block 162, this also goes directly to block 175.

The advantages of the transfer system according to the present invention will be clear from the foregoing description. In particular, it provides for picking randomly-spaced items 2 automatically, and with no damage to the same, off conveyor 6, by calculating the point at which pick-up head 33 will be located over item 2 and by rapidly activating the suction means on the same; as well as for automatically releasing items 2 in equally-spaced manner on to conveyor 15. Also, electronic control system 8 provides for fairly straightforward adjustment of the parameters set via block 101 in FIG. 5, for accommodating systems 1 and/or items 2 of various dimensions. Finally, rotary conveyor 12 features no electrical equipment, with the exception of electrovalves 48 and 50 on heads 33.

To those skilled in the art it will be clear that changes may be made to the system as described and illustrated herein without, however, departing from the scope of the present invention. For example, changes may be made to the design and arrangement of the conveyors, or to the values provided herein by way of example; or photoelectric elements may be employed for detecting passage of heads 33 in a predetermined position, or for disabling the same.

What is claimed is:

1. A system (1) for picking up randomly-spaced items (2) off first conveyor means (6) and transferring the same in equally-spaced manner on to second conveyor means (15), said system (1) comprising:
    third conveyor means (12) traveling between said first (6) and said second (15) conveyor means, and a series of pick-up means (33) assigned to said third conveyor means (12), and wherein the speed of said third conveyor means (12) differs from that of said first conveyor means (6);
    characterised by the fact that it comprises an electronic control system (8) comprising processing means (10) for determining a position wherein at least one of said pick-up means (33) corresponds with one of said items (2), and for accordingly enabling said pick-up means (33) for lifting said item (2) off said first conveyor means (6);
    said processing means (10) also providing for subsequently disabling said pick-up means (33) for transferring said item (2) in controlled, equally-spaced manner on to said second conveyor means (15);
    first means (70) for detecting passage of said item (2) on said first conveyor means (6) in a predetermined position on said system (1) and for supplying a first signal to said processing means (10); and
    second means for detecting passage of said pick-up means (33) in a predetermined position on said system (1) and for supplying a second signal to said processing means (10).

2. A system as claimed in claim 1, characterised by the fact that it comprises means (66) for detecting and quantifying travel of said third conveyor means (12).

3. A system as claimed in claim 2, characterised by the fact that said travel detecting and quantifying means (66) comprise a block (encoder) for emitting a number of spaced signals, and assigned to travel of said third conveyor means (12).

4. A system as claimed in claim 2, characterised by the fact that the output of said travel detecting and quantifying means (66) is connected to a counter (68) on said control system (8), and that said processing means (10) determine the first least significant bits on said counter (68), indicating a total count value equivalent to travel over one space between adjacent said pick-up means (33), for detecting the location of a given pick-up means (33) within said space and in relation to a predetermined position; said processing means (10) also determining a next number of most significant bits, for identifying the progressive number, within said series, of the pick-up means (33) to which said least significant bits refer.

5. A system as claimed in claim 4, characterised by the fact that it comprises means (71, 72) for identifying an initial element in said series of said pick-up means (33).

6. A system as claimed in claim 5, characterised by the fact that said means comprise a body (71) assigned to said initial element (33), and means (72) for detecting passage of said body (71) in a predetermined position.

7. A system as claimed in claim 1, characterised by the fact that each of said pick-up means (33) comprises suction means having a terminal member (36) supported on a body (35) designed to move between an idle position and a work position in the direction of said first conveyor means (6) for enabling pick-up of said item (2) by virtue of the action of first control means (48): each said pick-up means (33) also comprising second means (50) for enabling or disabling said suction means (36).

8. A system as claimed in claim 7, characterised by the fact that said suction means comprise a sucker (36) constituting said terminal member, and the cavity of which is connected pneumatically to a narrow-section portion (53) of a duct (52) in the form of a Venturi tube, the compressed air supply to which is controlled by said second control means (50).

9. A system as claimed in claim 7, characterised by the fact that said first control means (48) control the position of a pneumatic cylinder (57) between said idle and said work positions, and to which said terminal member (36) of said suction means is connected integral.

10. A system as claimed in claim 7, characterised by the fact that said first (48) and said second (50) control means comprise electrovalves.

11. A system as claimed in claim 10, characterised by the fact that said electrovalves (48, 50) are supplied with air via respective branches of a duct (39) series-connected between said pick-up means (33) and secured to said third conveyor means (12); said duct (39) being supplied with air by at least one duct (40) connected in sealed manner, at the other end, to a fixed portion (42) of said system (1).

12. A system as claimed in claim 10, characterised by the fact that said electrovalves (48, 50) are controlled by electric signals (65) supplied selectively by said control system (8).

13. A system as claimed in claim 1, characterised by the fact that said first detecting means comprise photoelectric means (70).

14. A system as claimed in claim 1, characterised by the fact that said processing means (10) determine the presence or absence of the rising edge of said first signal from said first detecting means (70).

15. A system as claimed in claim 1, characterised by the fact that said second detecting means detect the passage of said pick-up means (33) substantially at said passage position of said items (2) detected by said first detecting means (70).

16. A system as claimed in claim 1, characterised by the fact that said second detecting means detect the value of a predetermined count indicating element relative to transportation of said pick-up means (33) by said third conveyor means (12).

17. A system as claimed in claim 16, characterised by the fact that said predetermined count indicating element is the n-th bit of a counter (68) controlled by means (66) for detecting travel of said third conveyor means (12).

18. A system as claimed in claim 16, characterised by the fact that said second detecting means detect the presence or absence of the rising edge of said predetermined count indicating element.

19. A system as claimed in claim 1, characterised by the fact that said second detecting means form part of said processing means (10).

20. A system as claimed in claim 1, characterised by the fact that said processing means (10) comprise first means (102) for analysing said first and second signals from said first (70) and second detecting means, and selecting one of said pick-up means (33) for picking said item (2) off said first conveyor means (6).

21. A system as claimed in claim 20, characterised by the fact that said processing means (10) comprise second means (103) for enabling calculation of the position wherein said pick-up means (33) selected by said first analysing means (102) corresponds with said item (2), for enabling said pick-up means (33) upon reaching said position, and for subsequently disabling said pick-up means (33) upon reaching a predetermined position over said second conveyor means (15).

22. A system as claimed in claim 20, characterised by the fact that said processing means (10) comprise, as part of said first means (102) and/or said second means (103), third means (106, 107) for detecting the presence of a first of said first and second signals; fourth means (113, 118) for indicating the condition detected by said third means (106, 107); fifth means (105, 117) for detecting said indication by said fourth means (113, 118) and so detecting the presence of the second of said first and second signals; sixth means (124, 164) for quantifying the interval between reception of said first and second signals; and seventh means (114, 109, 110, 111, 112, 115) for identifying and selecting said pick-up means (33) by which said item (2) is to be picked off said first conveyor means (6).

23. A system as claimed in claim 22, characterised by the fact that said sixth means (124, 164) comprise means for detecting a count value relative to transportation of said pick-up means (33) by said third conveyor means (12).

24. A system as claimed in claim 22, characterised by the fact that said processing means (10) comprise eighth means (125) for determining whether said interval quantified by said sixth means (124), and corresponding to prior reception of said first signal, is greater than a predetermined value, and, in the event of a positive response, for indicating prior reception of said second signal.

25. A system as claimed in claim 22, characterised by the fact that said processing means (10) comprise ninth means (121) for determining whether, subsequent to prior reception of said first signal, a further first signal is received before said second signal, and, in the event of a positive response, for updating the interval quantifying data of said sixth means (124).

26. A system as claimed in claim 22, characterised by the fact that said processing means (10) comprise tenth means (123, 166) for canceling, subsequent to reception of the second of said first and second signals, indication of the condition detected by said third means (106, 107) and imposed by said fourth means (113, 118).

27. A system as claimed in claim 22, characterised by the fact that said seventh means (114, 109, 110, 111, 112, 115), for identifying and selecting said pick-up means (33) in said series, provide, in the event of said second signal being received first, for selecting the pick-up means (33−I) following said item (2) to be picked up, and, in the event of said first signal being received first, for selecting the pick-up means (33−I+1) following the one (33−I) supplying said second signal after said first signal.

28. A system as claimed in claim 22, characterised by the fact that said processing means (10) comprise eleventh means (165, 168) for calculating said position wherein said pick-up means (33) selected by said first analysing means (102) corresponds with said item (2) as a function of said interval between reception of said first and second signals and quantified by said sixth means (124, 164), and as a function of the speed ratio between said first (6) and third (12) conveyor means.

29. A system as claimed in claim 28, characterised by the fact that said eleventh means (165, 168) also calculate said position wherein said pick-up means (33) selected by said first analysing means (102) corresponds with said item (2) as a function of a predetermined parameter depending on the characteristics of said system (1) and quantifying the lag between enabling of said pick-up means (33) and actual suction and detachment of said item (2) off said first conveyor means (6).

30. A system as claimed in claim 28, characterised by the fact that said eleventh means (165, 168) also calculate said position wherein said pick-up means (33) selected by said first analysing means (102) corresponds with said item (2) as a function of a predetermined parameter depending on the length of said item (2).

31. A system as claimed in claim 28, characterised by the fact that said processing means (10) comprise twelfth means (161) for detecting said condition imposed by said fourth means (113, 118) and indicating prior reception of said first or said second signal, for calculating in a different manner, via said eleventh means (165, 168), said position wherein said pick-up means (33) selected by said first analysing means (102) corresponds with said item (2).

32. A system as claimed in claim 28, characterised by the fact that said processing means (10) comprise thirteenth means (167) for indicating performance of said calculation by said eleventh means (165, 168); and fourteenth means (160) for detecting said condition imposed by said thirteenth means (167) and preventing further operation of said eleventh means (165, 168).

33. A system as claimed in claim 28, characterised by the fact that said processing means (10) comprise fifteenth means (171) for detecting when said pick-up position calculated by said eleventh means (165, 168) has been reached, and for enabling said pick-up means (33); and sixteenth means (170) for detecting enabling of said pick-up means (33) and preventing further operation of said fifteenth means (171).

34. A system as claimed in claim 28, characterised by the fact that said processing means (10) comprise seventeenth means (173) for detecting when said predetermined position over said second conveyor means (15) has been reached, and for disabling said pick-up means (33).

35. A system as claimed in claim 33, characterised by the fact that said fifteenth means (171) and/or said seventeenth means (173) quantify attainment of said position commencing from a predetermined reference position and by comparing predetermined data or the data supplied respectively by said eleventh means (165, 168) with data supplied by count detecting means assigned to transportation of said pick-up means (33).

36. A system as claimed in claim 1, characterised by the fact that said items (2) consist of cakes of soap.

37. A system as claimed in claim 1, characterised by the fact that said first conveyor means (6) are located downstream from a machine (3) manufacturing said items (2), and that said second conveyor means (15) are located at the input of a machine (4) packing said items (2).

38. A system as claimed in claim 1, characterised by the fact that it comprises means (8, 7, 31, 19) for regulating and controlling a predetermined speed ratio of said first (6), said second (12) and said third (15) conveyor means.

39. A system (1) for picking up randomly-spaced items (2) off first conveyor means (6) and transferring the same in equally-spaced manner on to second conveyor means (15), said system (1) comprising:
third conveyor means (12) traveling between said first (6) and said second (15) conveyor means, and a series of pick-up means (33) assigned to said third conveyor means (12), and wherein the speed of said third conveyor means (12) differs from that of said first conveyor means (6);
characterised by the fact that it comprises an electronic control system (8) comprising processing means (10) for determining a position wherein at least one of said pick-up means (33) corresponds with one of said items (2), and for accordingly enabling said pick-up means (33) for lifting said item (2) off said first conveyor means (6);
said processing means (10) also providing for subsequently disabling said pick-up means (33) for transferring said item (2) in controlled, equally-spaced manner on to said second conveyor means (15);
means (66) for detecting and quantifying travel of said third conveyor means (12);
the output of said travel detecting and quantifying means (66) being connected to a counter (68) on said control system (8), and that said processing means (10) determines the first least significant bits on said counter (68) indicating a total count value equivalent to travel over one space between adjacent said pick-up means (33) for detecting the location of a given pick-up means (33) within said space and in relation to a predetermined position;
said processing means (10) also determining a next number of most significant bits, for identifying the progressive number, within said series, of the pick-up means (33) to which said least significant bits refer; and
means (71, 72) for identifying an initial element in said series of said pick-up means (33).

40. A system as claimed in claim 39, characterised by the fact that said means comprises a body (71) assigned to said initial element (33), and means (72) for detecting passage of said body (71) in a predetermined position.

* * * * *